United States Patent [19]
Dye

[11] Patent Number: 5,909,219
[45] Date of Patent: Jun. 1, 1999

[54] EMBEDDING A TRANSPARENCY ENABLE BIT AS PART OF A RESIZING BIT BLOCK TRANSFER OPERATION

[75] Inventor: Thomas Anthony Dye, Austin, Tex.

[73] Assignee: Cirrus Logic, Inc., Fremont, Calif.

[21] Appl. No.: 08/999,462

[22] Filed: Nov. 19, 1997

Related U.S. Application Data

[63] Continuation of application No. 08/672,642, Jun. 28, 1996, abandoned.

[51] Int. Cl.[6] .................................................. G06F 12/00
[52] U.S. Cl. .......................... 345/430; 345/431; 345/525
[58] Field of Search .................................. 345/430, 431, 345/435, 433, 521, 522, 525, 526

[56] References Cited

U.S. PATENT DOCUMENTS

| | | | |
|---|---|---|---|
| 4,965,745 | 10/1990 | Economy et al. ...................... | 345/431 |
| 5,428,724 | 6/1995 | Silverbrook ............................ | 395/135 |
| 5,467,442 | 11/1995 | Tsubota et al. ........................ | 395/135 |
| 5,473,737 | 12/1995 | Harper ................................... | 395/131 |
| 5,493,646 | 2/1996 | Guttag et al. .......................... | 395/525 |
| 5,495,564 | 2/1996 | Takahashi ............................... | 395/135 |

Primary Examiner—Cliff N. Vo
Attorney, Agent, or Firm—Jonathan M. Harris; Steven A. Shaw

[57] ABSTRACT

The present invention includes an integrated resize engine and color compare logic for performing a resize bit block transfer (BitBLT) and a transparency BitBLT in a single operation. A source array of pixels is stretched and/or shrunk based upon control signals. The resized pixel values include red, green, and blue color values which are compared with predetermined color range values stored in register pairs. Preferably a register pair is provided for each color. A set of comparators is provided for each color to compare the register values with the color pixel values and to produce an output signal (IN RANGE) indicating if the color pixel value is within the range established by the register values. Each of the in range signals is provided to multiplex logic which generates a transparency enable (TE) output signal based upon the value of the IN RANGE signals and the value of a SELECT input signal. The transparency (TE) signal is written to a dedicated bit in a pixel value register to embed the transparency enable bit as part of the pixel value. Alternatively, or in addition to the multiplex logic, mask logic may be provided to mask the pixel based upon the IN RANGE output signals.

31 Claims, 5 Drawing Sheets

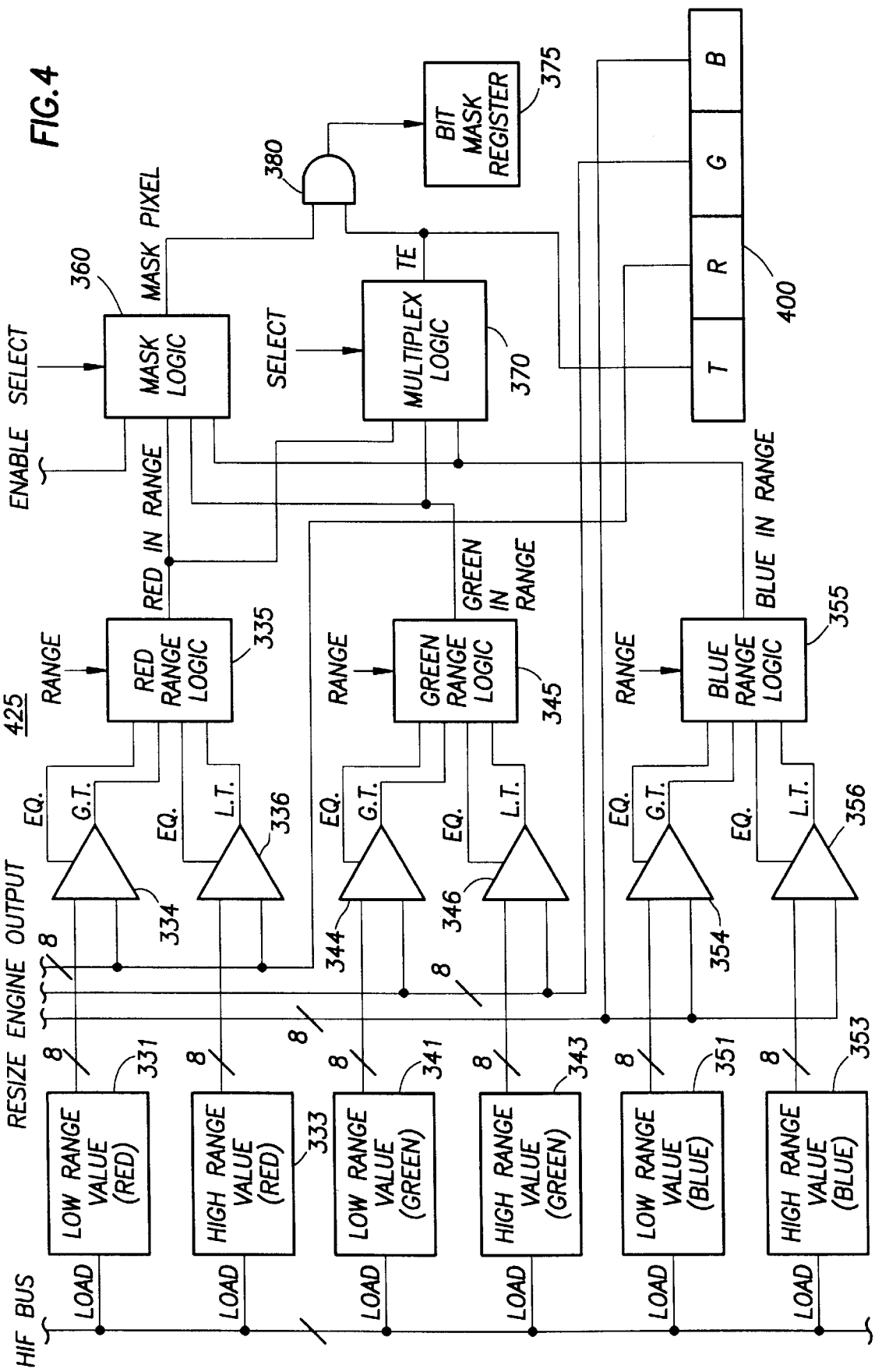

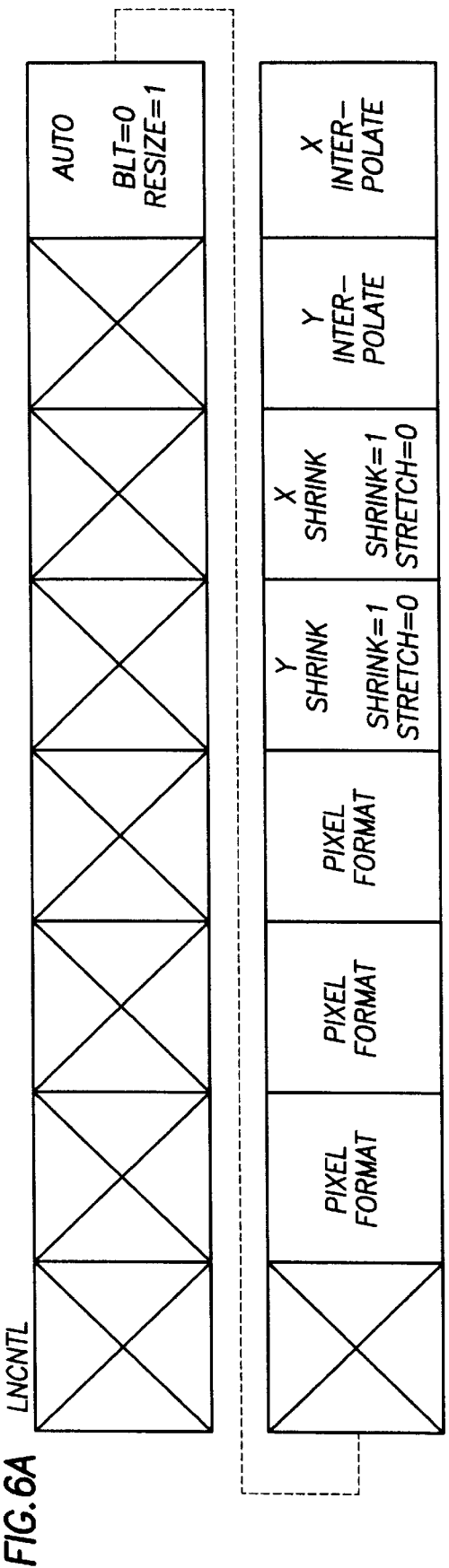
FIG. 6A LNCNTL
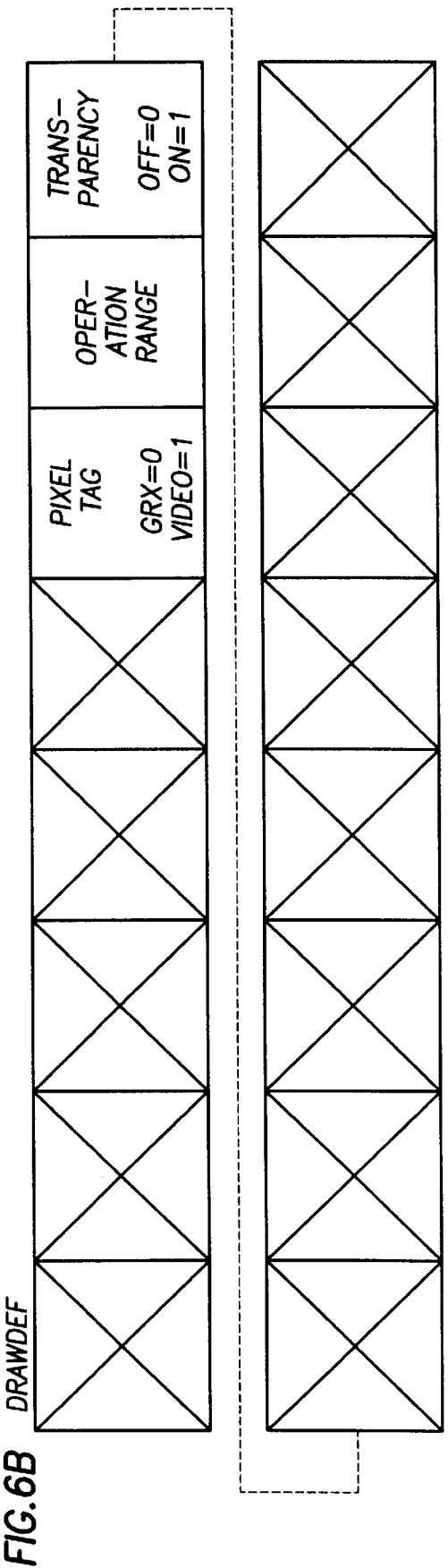
FIG. 6B DRAWDEF

5,909,219

EMBEDDING A TRANSPARENCY ENABLE BIT AS PART OF A RESIZING BIT BLOCK TRANSFER OPERATION

This application is a continuation of application Ser. No. 08/672,642 filed on Jun. 28, 1996, now abandoned.

FIELD OF THE INVENTION

The present invention relates generally to a graphics subsystem for a personal computer (PC). More particularly, the present invention relates to a system and method for embedding a transparency enable or asserting a mask signal as part of a resizing bit block transfer operation.

BACKGROUND OF THE INVENTION

Before the availability of the personal computer (PC), computer graphics packages were expensive tools primarily reserved for industrial applications. Early microcomputers were only capable of rendering simple line drawings with a low screen resolution (256×256, for example).

As microcomputers evolved, higher resolution color displays became available, and software applications routinely provided data output in a graphical manner. Objects typically were defined in terms of absolute coordinates using straight lines. Subsequently, graphics "primitives" were used, enabling circles, ellipses, rectangles and polygons to be drawn with a single instruction. The use of primitives that can be rendered with a single instruction set of parameters has increased the speed at which the images can be rendered.

The availability of computer graphics has generated a demand for higher resolutions and three dimensional (3-D) rendering capabilities. Computer animation and games, in particular, have driven a demand for even greater graphics capabilities. A 3-D image can be represented in a computer system as a collection of graphical objects, such as polygons, lines, and points. A set of vertex points defines a polygon. Associated with each point are certain pixel values, such as shading, texturing, color, and the like. Identification of other points within the polygon typically is done through the use of linear interpolation. Once interpolated, the polygon can be rendered on a computer monitor by successive scanning of orthogonal rows of the polygon.

Even with more sophisticated graphics packages, developing animation applications can be a tedious and time consuming process. Moreover, the more detailed the graphics application, the greater the work required to produce the graphics. To reduce the amount of work required, programmers often repeat images in the animation. Graphics packages have been developed which facilitate the use of previous graphics data. In particular, the use of bit block transfers (BitBLT's) have become common as a vehicle to quickly and easily modify previous graphics data to obtain new graphics data arrays. During a BitBLT operation, display data stored in the frame buffer or in host memory is used as source data to generate an image destined for display. Thus, a source array of pixels in the frame buffer or host memory is used to generate a destination array of pixels in the frame buffer for display on the display device. As one skilled in the art will understand, other bit block transfers also are possible, such as replacing a destination array of pixels with a pixel-by-pixel combination of the destination array and data from a pattern.

Various BitBLT's have become standard in the graphics industry for quickly and efficiently generating an image to obtain a destination image for display. Examples of some common BitBLT operations include resize and transparency BitBLT's. The use of these and other BitBLT's enables previously used images to be used in some fashion to more quickly render a new image. Thus, for example, the resize BitBLT permits the size of a previously used image to be either enlarged (a stretch BitBLT) or reduced (a shrink BitBLT), as desired to fit the needs of the graphics application. It may desirable, for example, to shrink or stretch an image to show relative distance to an object. Stretch BitBLT operations are performed by interpolating an existing image, while shrink BitBLT's are obtained by averaging or decimating pixel values in an image. Thus, for example, in a stretch operation four pixels may be used to represent what previously was one pixel. Conversely, in a shrink operation, one pixel may be used to represent what previously was shown in four pixels.

Another desirable BitBLT operation is one which permits use of a portion of a previous image, which may be implemented through a transparency BitBLT. Thus, an object moving through a scene may be repeatedly re-used in subsequent scenes by making transparent the background around the object, permitting the object to be overlaid on a different background. For example, a car passing in front of a row of stores may be repeatedly re-used by making transparent the background around the car, and then moving the car (with the masked background) to various destinations on the screen.

BitBLT's normally are transferred in rectangular pixel blocks to simplify the logic and to avoid the need to precisely define the edge of a complex object. Performing a transparent BitBLT on an object within the rectangular image is achieved by placing the desired object on a constant color (or pattern) background and essentially lifting the object off of the background through the use of a color (or pattern) comparison operation. Thus, an object on a blue background can be copied to the destination region of the screen by transferring a rectangular pixel array including the object and blue background. The blue background then is detected by color comparisons and made transparent. Preferably, a transparency bit is provided or embedded with each pixel value in the image to indicate whether the pixel value is to be transparent or displayed. In this fashion, images may be copied to a destination location, with only the desired object displayed, based upon the status of the embedded transparency pixel value. Thus, the blue background pixels are compared and the transparency bit enabled (based on color range of blue) so that during a transparency BitBLT operation the blue background in the destination array may be made transparent, while the desired object is displayed.

In certain instances, it may be advantageous to perform a transparency bit block transfer on an object, while also resizing the object. A problem arises, however, when a resize BitBLT is combined with a transparency BitBLT because of the fact that the transparency enable bit is lost during resizing operations. Take, for example, an image with sixty-four pixels, twenty of which are transparency enabled. If the image is reduced from sixty-four to sixteen pixels, there is no clear technique available to maintain the integrity of the transparency bit embedded in the image. As a result, the transparency bit value must either be disregarded or the subject of error. Without the use of the embedded transparency bit, there is no quick method for performing the transparency BitBLT.

In addition, it has become increasingly desirable to use video data as an input to graphics applications. Video signals (referred to as YUV), however, must be converted to graphics signals (referred to as RGB) for displaying on conventional personal computer (PC) graphics systems. In many instances, the conversion takes a relatively large amount of time. The video data typically must be scaled, filtered and converted to an RGB value. In addition, if desired for texture mapping, the data also then must be color compared. It would be advantageous if a bit block transfer operation was available that was capable of performing the data manipulation of the video data in a single process.

SUMMARY OF THE INVENTION

The present invention provides a system for embedding a transparency enable bit as part of the destination array of pixels during a resize BitBLT operation. In the preferred embodiment, a color comparison is performed on the output of a resize (stretch or shrink) BitBLT to detect certain predetermined color values or ranges. If a predetermined color range or a particular combination of color ranges is detected, a transparency enable bit is embedded in the destination pixel data field. In this manner, a foreground object can be distinguished from a background color after being resized. Subsequent use of the resized object for texture mapping or other transparency BitBLTS's is simplified because of the fact that the transparency bit is embedded in the destination pixel data field.

The present invention includes an integrated resize engine and color compare logic for performing the combination resize/transparency BitBLT operation. The resize engine preferably operates in accordance with known techniques to resize an image through stretching and/or shrinking the image. The RGB output signals from the resize engine are provided as an input signal to the color compare logic, which compares the RGB output signals with predetermined range values stored in register pairs. Each color preferably has a separate register pair defining threshold values for transparency. In range signals are generated for each of the red, green and blue values as a result of the comparison of the resized color pixel values with the register values. A transparency enable signal is generated by multiplex logic based upon the in range signals and a select signal. Alternatively, or in addition to the transparency enable signal, a mask pixel signal also may be generated based upon the in range signals. The transparency enable signal is provided directly to a transparency bit in the pixel data field, together with the resized RGB values from the resize engine. The mask pixel signal conversely is provided to a bit mask register to indicate whether the pixel should be masked.

In the preferred embodiment of the invention, the output of color converter logic is provided directly to the resize engine and color compare logic. The color converter logic converts video (YUV) signals to graphics (RGB) signals. The converted output then is resized as necessary by the resize engine, thus providing the proper size for the video image, and also providing filtering if the image is shrunk. The color compare logic functions to isolate any desired objects in the video image to provide an image that can be immediately used for texture mapping or further transparency bit block transfers without a large quantity of additional processing.

These and other advantages of the present invention will be apparent to one skilled in the art upon reading the following detail description of the invention.

BRIEF DESCRIPTION OF THE DRAWINGS

A better understanding of the present invention can be obtained when the following detailed description of the preferred embodiment is considered in conjunction with the following drawings, in which:

FIG. 4 is a block diagram further illustrating the preferred embodiment of the color compare logic of FIG. 2;

FIGS. 6A and 6B illustrate exemplary control registers with status bits identifying resize and transparency BitBLT operations.

DETAILED DESCRIPTION OF THE PREFERRED EMBODIMENT

Figure 1:
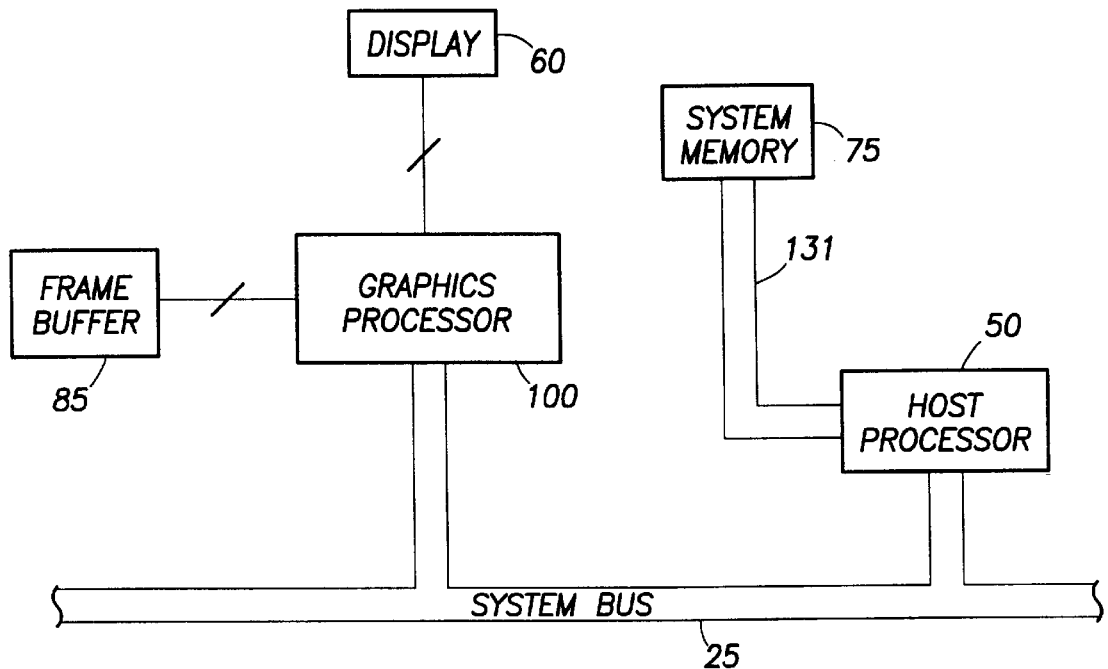
FIG. 1 is a simplified block diagram of a graphics processor connected to a host processor via a system bus in a computer system, according to the principles of the present invention.
Figure 2:
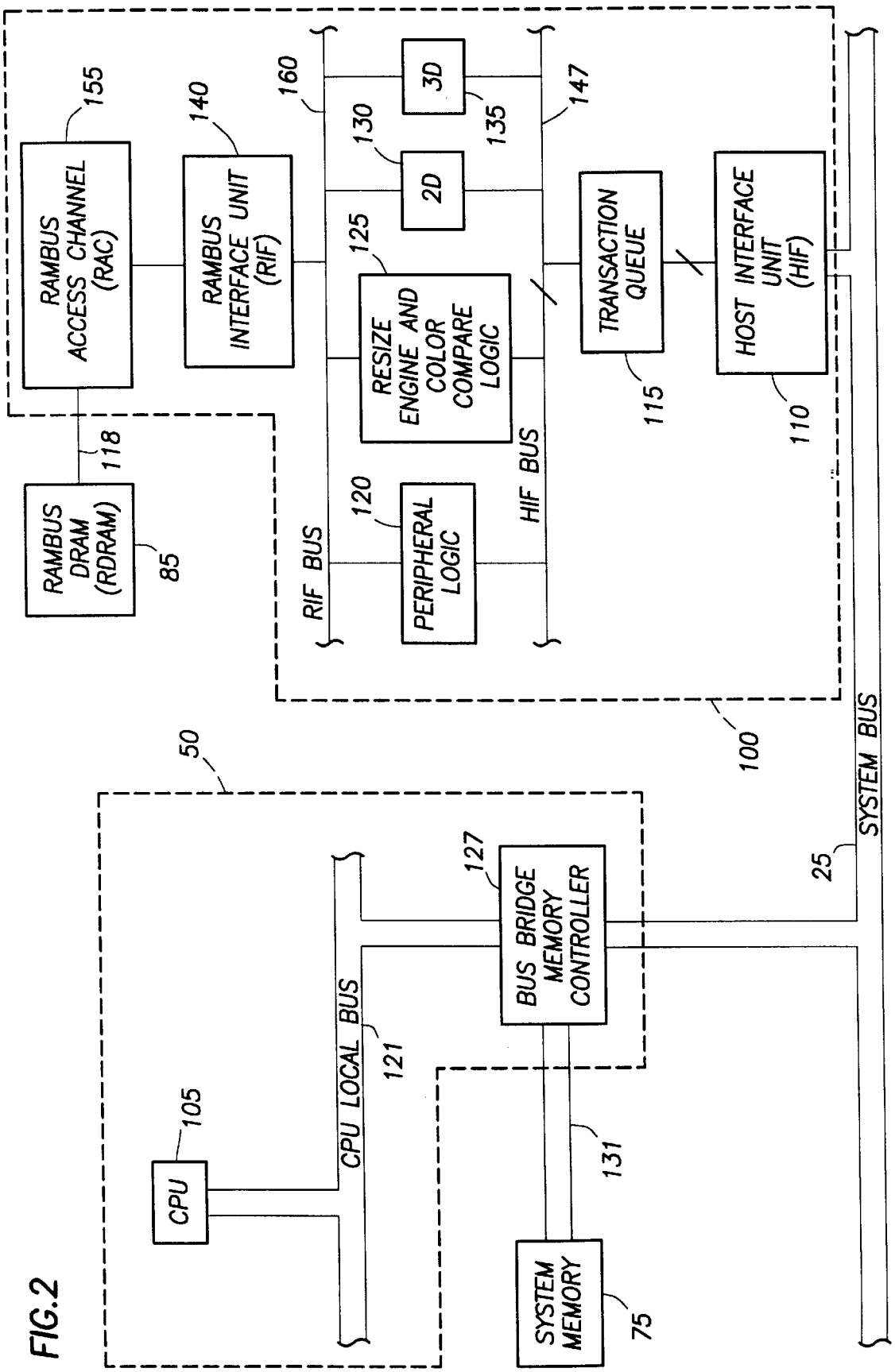
FIG. 2 is a block diagram showing in more detail the graphics processor and host processor of FIG. 1.

Referring now to FIGS. 1 and 2, the present invention relates generally to a graphics subsystem for a personal computer (PC) capable of rendering polygons preferably using a main slope technique. As shown in FIG. 1, the graphics system generally includes a host processor 50 coupled to a system bus 25, a system memory 75 coupled to the host processor via a memory bus 131, a graphics processor 100, a frame buffer 85, and a display unit 60. The host processor 50 may comprise the central processing unit of a PC, while system memory 75 may comprise the working memory, or random access memory array of the PC.

The host processor 50 preferably includes a software driver that provides instructions (or "opcode") to the graphics processor 100 to indicate the type of graphics operation to be performed. The instructions indicate whether the graphics processor is to perform a rendering operation, institute a read/write cycle, branch to a particular address, or perform a control operation, for example. With respect to rendering operations, the instructions also preferably identify the type of primitive to be rendered. In addition to generating instructions, the software driver also generates display parameters, which define display objects to be rendered by the graphics processor 100. Thus, for example, the software driver may identify the spatial location of points, line endpoints, or vertex coordinates of polygons. For polygons, the software driver also preferably identifies main slope and width slope values for the polygon. When applicable, the software driver also identifies color intensity values and slopes, texture values and slopes, and various other parameter values as will be understood by one skilled in the art. Thus, the software driver calculates and loads main and orthogonal slopes, start and stop values for pixel position, intensity, depth and transparency of objects to be rendered by the graphics processor 100. The software driver preferably is loaded into the system memory 75 from a permanent magnetic storage device, such as a hard drive or CD ROM drive device (not specifically shown). Once loaded, the software driver is executed by the host processor 50 in accordance with techniques well known to one skilled in the art.

It should be understood that the particular configuration shown in FIGS. 1 and 2 is only one of many possible implementations of a graphics subsystem for use in a personal computer system. As one skilled in the art will understand, alternative configurations are possible without departing from the principles of the present invention. Thus, for example, the system memory 75 may directly connect to the system bus 25 through a memory control unit external to the host processor 50. FIG. 1 is simplified for purposes of clarity so that many components and control signals are omitted which are not required for an understanding of the present invention. In the preferred embodiment, the graphics processor 100 receives digital data from the system memory 75 or host processor 50, and processes the data to define pixel values. The pixel values are stored in the frame buffer 85, and ultimately displayed on the display device 60.

In accordance with the preferred embodiment, the host processor 50 provides parameter values and other instructions in the form of a display list, which typically is stored in system memory 75 until required by the graphics processor 100. Alternatively, the host processor 50 may directly write the display list to the graphics processor 100 in accordance with known techniques. The host processor 50 and system memory 75 both preferably communicate with the graphics processor 100 via the system bus 25. The system bus 25 may comprise any one of a plurality of different types of host or input/output (I/O) buses, including the industry standard architecture (ISA), the extended ISA (EISA), the peripheral component interconnect (PCI), the video electronic standard association (VESA) local bus or any other standardized system bus of a computer system. A CPU local bus 121 is shown in FIG. 2 interconnecting the internal host processor components, in accordance with the preferred embodiment. In accordance with the present trend in the microprocessor industry, the graphics processor functions may be integrated with the host processor 50. If the graphics processor 100 is integrated as part of the host processor 50, then system bus 25 essentially becomes part of the CPU local bus 121.

In accordance with the preferred embodiment, and as best seen in FIG. 2, a bus bridge/memory controller 127 couples to the local bus 121, memory bus 131, and system bus 25. The bus bridge 127 functions to orchestrate the transfer of address, data and control signals between the CPU local bus 121 and system bus 25. Further, the bus bridge 127 preferably functions as a memory control unit to control transactions to the system memory 75 from either the system bus 25 or local bus 121. The bus bridge couples to the memory 75 via a memory bus 131. The timing and protocol of memory transactions is well known to one skilled in the art, and thus will not be detailed.

Referring still to FIGS. 1 and 2, the graphics processor 100 preferably couples to the system bus 25. In accordance with the preferred embodiment, and as shown in FIG. 2, the graphics processor 100 preferably includes a host interface unit 110 with bus mastering capabilities, thus permitting graphics processor 100 to obtain mastership of the system bus 25. Once mastership of the system bus 25 is obtained, the graphics processor 100 may initiate a read cycle to system memory 75 to read the display list, instead of waiting until the host processor 50 performs a write operation to the graphics processor 100. The graphics processor 100 preferably includes a transaction queue 115 for storing instructions and drawing parameters prior to use by the 2D and 3D rendering engines and BitBLT engines. The transaction queue 115 couples to the host interface bus (HIF) 147 to latch in and temporarily store data and instructions fetched by the host interface unit 110. Preferably connected to the HIF bus 147 are the 2D engine 130, 3D engine 135, resize engine and color compare logic 125, and other peripheral devices 120. The peripheral devices may include a texture or other BitBLT engine, an enhanced video port, VGA logic, display refresh logic, host direct access logic and other logical modules that will be apparent to one skilled in the art.

In accordance with the preferred embodiment, the 2D engine 130 corresponds to the 2D engine implemented in assignee's LAGUNA CL-GD546X VISUALMEDIA™ ACCELRATOR. The 2D graphics engine 130 preferably comprises a 64-bit three operand engine that accelerates bit block transfer operations, as well as performing line draws, polygon draws and polygon fill operations. The 2D engine 130 preferably operates at a clock speed of 62.5 MHz to match the speed of the RAMBUS. Additional details of the 2D engine are available in the Technical Reference Manual for the Laguna Family VisualMedia Accelerators, Model # CL-GD546X. In accordance with the preferred embodiment, the 3D engine 135 preferably provides three dimensional polygon rendering with texturing, shading and Z buffering capabilities. The 3D engine 135 preferably implements a main slope technique for rendering polygons. The resize engine and color compare logic 125 preferably permits transparency embedding as part of resize operations, and further permits conversion of video signals (YUV) to graphics signals (RGB). The rendering engines, BitBLT engines, and other peripheral devices couple to the frame buffer 85 via a RIF bus 160.

As shown in FIG. 2, the frame buffer 85 preferably comprises a bank of RAMBUS RAM (referred to herein as RDRAM), where the digital data stored in the RDRAM comprises a rectangular array of picture elements referred to as pixels or pixel values. The RDRAM buffer 85 provides a performance improvement by permitting faster access to display list instructions and pixel data, compared to accessing data stored in the main memory 75 of the host computer system. A RAMBUS interface (RIF) 140 preferably interfaces the rendering engines 125, 130, 135 and peripheral devices 120 to the RDRAM frame buffer 85. The RAMBUS interface 140 preferably connects directly to one or more RAMBUS access channels (RAC) 155. Each RAC is capable of supplying burst data at clock speeds up to 528 Mbytes per second. Requests to access the RAMBUS channels come from the modules shown in FIG. 2, including the 2D engine 130, 3D engine 135 and the other peripheral devices. The RAMBUS access channels 155 connect to the RDRAM 85 to transfer pixel data to and from the RDRAM 85.

As shown in FIG. 1, graphics controller 100 also connects to a display unit 60. The display unit 60 may be any suitable type of display device, such as a cathode ray tube (CRT) for desktop, workstation or server applications, a liquid crystal display (LCD), a thin film transistor (TFT) display, or any other suitable display device for a personal computer. The graphics processor 100 provides pixel values to display unit 60 for displaying graphical data on a screen-by-screen basis.

Figure 3:
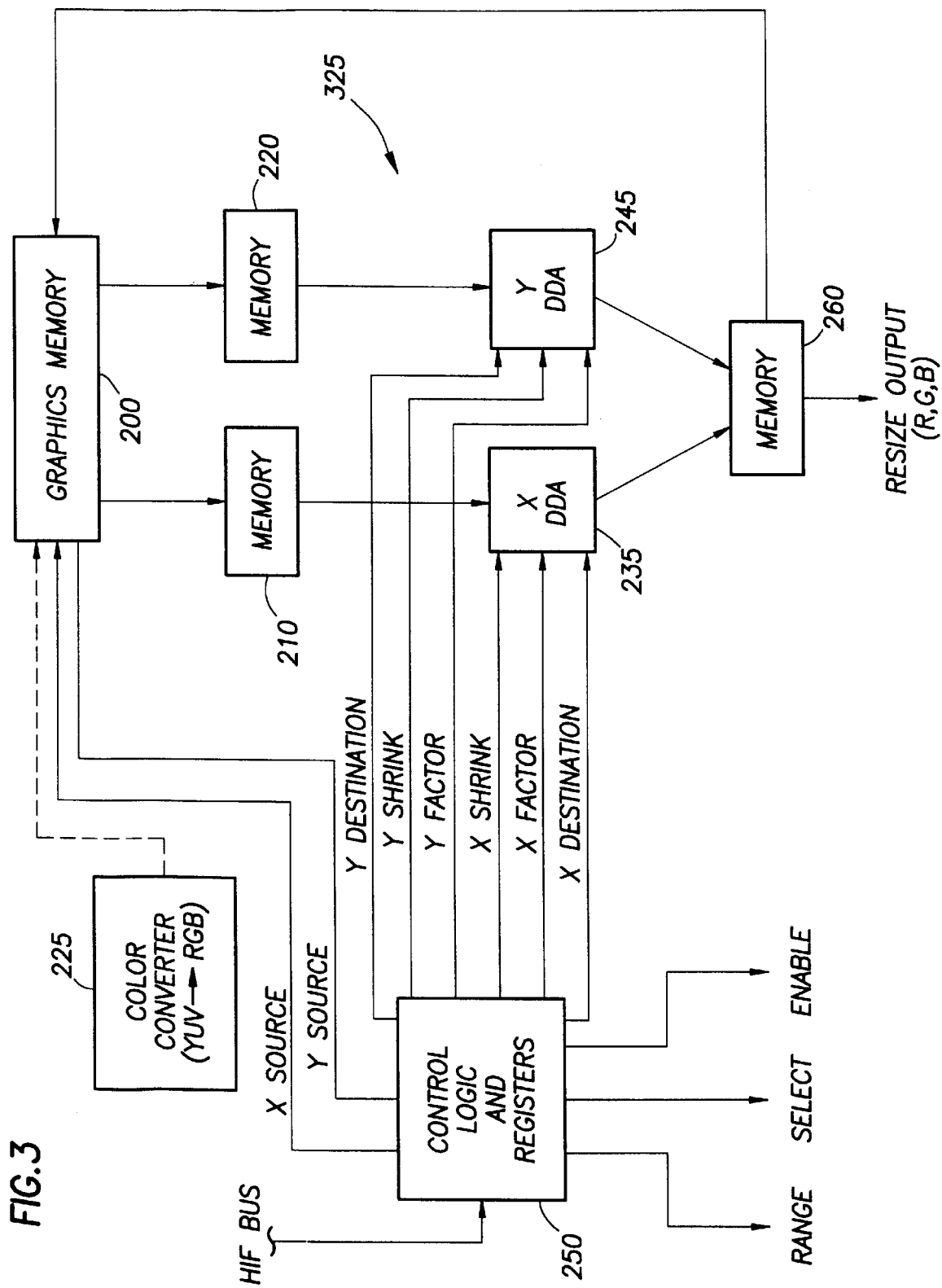
FIG. 3 is a block diagram further illustrating the resize engine of FIG. 2.

Referring now to FIGS. 3 and 4, the preferred implementation of the integrated resize engine and color compare logic 125 will now be described. Referring initially to FIG. 3, the resize engine 325 is shown. The resize engine portion of the resize engine and color compare logic preferably corresponds to the resize engine implemented in assignee's LAGUNA CLGD546X VISUALMEDIA™ ACCELERATOR. The following discussion of the resize engine is an overview of the structure and operation of the resize engine. Additional details of the resize engine and operation may be found in the Technical Reference Manual for the LAGUNA CL-GD546X.

Referring still to FIG. 3, the resize engine preferably includes a first memory device 210, a second memory device 220, an X digital data analyzer (DDA) 235, a Y DDA 245, control logic and registers 250, and an output memory device 260. In addition, color converter logic 225 may be provided as part of the resize engine 325, or may be located external to the resize logic. In the preferred embodiment, the first and second memory devices 210, 220 comprise static random access circuits (SRAM) which connect to a graphics memory 200. Preferably, the graphics memory 200 comprises the frame buffer 85 of FIGS. 1 and 2, but other memory devices may also be accessed for pixel data, such as the system memory 75. The graphics memory 200 includes controller circuitry (not shown specifically) that receives address signals from the control logic and registers 250 identifying the address of the source array of pixels to be resized. Preferably, the source address values define a rectangular block of pixels to simplify the logic. In response to the address signals which identify the source array of pixels, the graphics memory outputs the source array pixel values to the first and second memory devices 210, 220. The first and second memory devices 210, 220 preferably receive the same pixel information for subsequent processing by the X DDA 235 and Y DDA 245. Thus, a copy of the source array of pixels is stored in the memory devices 210, 220.

In addition to reading the source pixel values from memory devices 210, 220, the X DDA 235 and Y DDA 245 also receive control signals and address signals from control logic and registers 250. Some of the control signals received by the DDA devices 235, 245 include a signal (X SHRINK and Y SHRINK) indicating whether a shrink operation or a stretch operation is to occur, an x and y pixel destination address, and a shrink (or stretch) factor signal (X FACTOR and Y FACTOR). Other signals also may be provided to the DDA devices 235, 245 as will be apparent to one skilled in the art. In response to the signals and pixel data, the DDA devices 235, 245 modify the source pixel values by either shrinking or stretching the images according to the control signals. In addition, the DDA devices 235, 245 may be instructed to use a certain technique to perform the stretching or shrinking. Thus, for example, the DDA devices 235, 245 may be instructed by control logic and registers 250 to perform a shrink operation by either decimation or by averaging. The control signals from control logic and registers 250 are independently derived to permit a shrink in one direction, with a stretch in the other, or a different factor of resizing in the x and y directions. The X DDA 235 preferably performs interpolation or averaging (or other resizing operations) on pixels within a scanline to provide stretching or shrinking in the x direction. The Y DDA 245 preferably provides resizing in the y direction.

The resized x and y values are provided to a temporary memory storage device 260 prior to being written to a destination array based upon the x and y address values. Memory device 260 preferably comprises a FIFO register. As shown in FIG. 3, the resized pixel values also may be provided as source values for subsequent resizing operations.

The control logic and registers 250 preferably includes a plurality of registers which indicate the status of the control signals, such as the x and y source address values, the x and y destination address values, the shrink/stretch control signals, and the shrink/stretch factor. In addition, registers also may be provided to define the pixel format, to indicate whether a resize BitBLT is to be performed by the resize engine, and to indicate the manner in which resizing is to be determined. Thus, as shown for example in FIG. 6A, a 16 bit line control (LNCNTL) register may be provided in control logic and registers 250 for defining certain control parameters. The configuration of the LNCNTL register may be modified as desired to change the bit positions or the information encoded, depending upon the desired operation of the resize engine. As shown in FIG. 6A, the LNCNTL register preferably includes two bits (bit 0 and bit 1) defining whether an interpolation is to occur in the X and Y DDA devices. Two bits also are used (bits 2 and 3) to indicate if a shrink or resize operation is to occur. Bits 4, 5 and 6 of the LNCNIL preferably determine the pixel format. Some of the available formats encoded by bits 4, 5 and 6 include a 16 bit per pixel (bpp) width with a 1:5:5:5 format (where the 1 represents a transparency bit, and the 5's represent compressed red, green and blue values); a YUV format; a 32 bpp format; and a 24 bpp format. Lastly, bit 8 of the LNCNTL register identifies whether a resize BitBLT is to occur, and thus whether the resize engine is enabled. The other bit values are not pertinent to the present invention, or comprise bits reserved for future enhancements.

Other registers also preferably are provided in the control logic 250, including registers defining the XY extents (the size of the destination pixel array) for the resize BitBLT operation, resize registers identifying the location of source color pixel data for resize BitBLT operations, and shrink/increment registers identifying the shrink or increment factor. Other registers also may be provided in accordance with the operations to be performed by the resize engine.

In addition, a draw definition register DRAWDEF may be provided in the control logic 250, as shown in FIG. 6B. In the preferred embodiment of FIG. 6B, the DRAWDEF register includes bits 8, 9 and 10 which relate to transparency BitBLT operations. Bit 8 of the DRAWDEF register identifies whether transparency is enabled, while bit 9 defines whether the color compare logic looks for an in range or out of range value during a color compare operation. Bit 10 of DRAWDEF identifies whether the pixel data is in a video or graphics format. Other registers also may be provided in the control logic and registers 250 to define control values for the color compare logic, such as SELECT signals for the multiplex logic and an ENABLE signal for mask logic.

Referring now to FIG. 4, the color compare logic 425 portion of the resize engine and color compare logic 125 now will be described. Color compare logic 425 preferably couples to the resize engine 325 and receives red, green and blue (RBG) output values indicating the pixel color parameters. As shown in FIG. 4, the color compare logic 425 preferably includes a set of registers 331, 33, 341, 343, 351, 353 with associated comparators 334, 336, 344, 346, 354, 356, range logic devices 335, 345, 355, mask logic, 360, multiplex logic 370, mask register 375, and pixel data field register 400.

The registers preferably are divided into pairs to define an upper and lower threshold value for each of the primary colors red, green and blue. Thus, register 331 defines a lower threshold value for the color red, while register 333 defines an upper threshold value for red. Registers 341 and 343 define lower and upper threshold values, respectively, for the color green. Similarly, registers 351, 353 define lower and upper threshold values for the color blue. In accordance with the preferred embodiment, each of the registers 331, 333, 341, 343, 351, 353 are loaded with an eight bit digital value indicative of a color. The color values are loaded in a particular register during load accesses to that register, preferably via the HIF bus. Once loaded, the registers define threshold parameter ranges for the color compare logic 425. The use of the three register pairs for each color permits the color compare logic to mask a pixel based upon a single color value, or upon multiple color values.

Referring still to FIG. 4, comparators 334, 336, 344, 346, 354, 356 also are preferably divided into pairs to define upper and lower comparators for each of the primary colors red, green and blue. Thus, for example, comparators 334, 336 receive the red pixel value output from the resize engine 325 (of FIG. 3) and preferably function as lower and upper comparators for the color red. Comparator 334 couples to the low range red value register 331 and compares that value with the red pixel value from the resize engine. If the red pixel value is greater than the value stored in register 331, comparator 334 produces a logical "1" output signal on the GT output line. In the preferred embodiment, the comparator 334 also produces a logical "1" on the EQ output line if the red pixel value equals the value in register 331. Comparator 336 preferably provides a logical "1" on LT output line if the red pixel value from the resize engine is less than the value stored in high range register 333, and a logical "1" on the EQ output line if the two values are equal.

In similar fashion, comparators 344 and 346 preferably compare the green pixel value from the resize engine with the values in registers 341, 343, respectively, and produce output signals based upon the comparisons. If the green pixel value is greater than the low range value in register 341, comparator 344 generates a logical "1" output signal on the GT output line. If the two values are equal, comparator 344 produces a logical "1" value on the EQ output line. Comparator 346 preferably provides a logical "1" on LT output line if the green pixel value from the resize engine is less than the value stored in high range register 343, and a logical "1" on the EQ output line if the two values are equal.

Comparators 354, 356 preferably define upper and lower comparators for the color blue. Comparator 354 compares the low range value for blue in register 351 with the blue pixel value from the resize engine and produces a logical "1" signal on the GT output line if the blue pixel value is greater than the register value, and a logical "1" signal on the EQ output line if the blue pixel value equals the value in register 351. Comparator 356 produces a logical "1" signal on the LT output line if the blue pixel value is less than the value in register 353, and a logical "1" signal on the EQ output line if the value in register 353 equals the blue pixel value from the resize engine.

Figure 5:
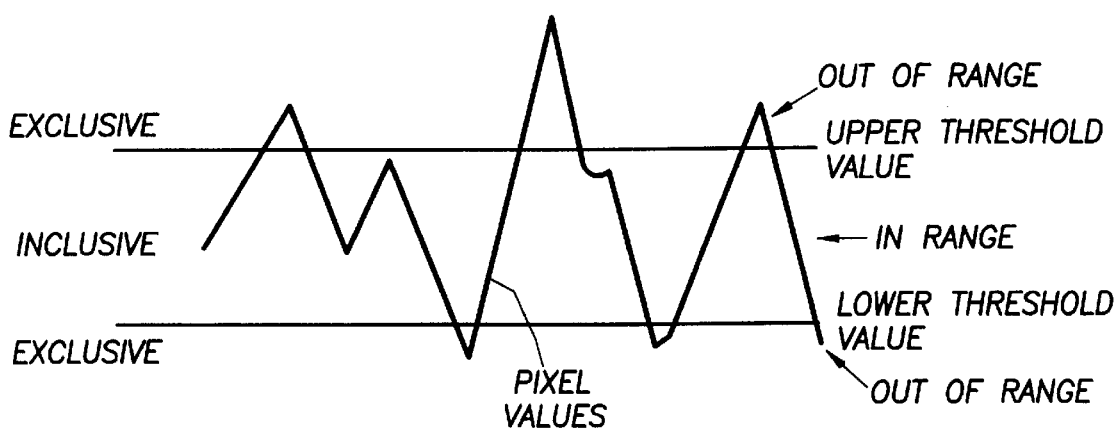
FIG. 5 is a graph depicting the color comparison operation.

The red range logic 335 preferably receives a RANGE control signal identifying the parameters for determining if a pixel value is "in range." In the preferred embodiment, range logic 335 looks for pixel values within the upper and lower threshold range defined by registers 333 and 331, as shown in FIG. 5. The RANGE value, however, may instruct range logic to examine the output signals from comparators 334, 336 to also consider equal values, for example. The RANGE control signal may even instruct range logic 335 to assert the IN RANGE output when the color pixel value falls outside the range established by registers 331 and 333. In the exemplary embodiment, the RANGE value may be encoded in the DRAWDEF register of FIG. 6B, and stored in the control logic and register 250 of FIG. 3. Various other alternatives for defining the range logic will be apparent to one skilled in the art. As an alternative, pre-set conditions for range parameters may be established, thus negating the need for the RANGE control signal.

Referring now to FIGS. 4 and 5, if the output signals from comparators 334, 336 satisfy the range control parameters, then red range logic 335 generates an output signal (RED IN RANGE) indicating the red pixel value from the resize engine is within the range specified by registers 331, 333. Thus, as shown for example in FIG. 5, the red range logic 335 produces a logical "1" output signal indicating that the red pixel value is within range for each of the points in FIG. 5 where the pixel value is between the upper and lower threshold values. Similarly, the green range logic 345 and blue range logic 355 produce GREEN IN RANGE and BLUE IN RANGE output signals, respectively, based upon the comparison of the pixel value provided by the resize engine output with the predetermined register values.

Referring again to FIG. 4, the IN RANGE values preferably are provided to both multiplex logic 370 and mask logic 360. In the preferred embodiment, the multiplex logic 370 is programmable by a SELECT signal to produce an output based upon certain selected input IN RANGE values. Preferably, the SELECT signal is generated by control logic and registers 250 in FIG. 3, although as one skilled in the art will understand, other logical devices may be used to generate the SELECT signal. The SELECT signal may, for example, indicate that the RED IN RANGE value is provided as the output of the multiplex logic. Alternatively, the SELECT signal may require that all three IN RANGE values be combined together through an AND operation to produce the multiplex output signal. As another alternative, the three IN RANGE values may be combined in a OR operation to produce the multiplex logic output signal. Various other combinations of IN RANGE signals may be used to define the multiplex logic output 370, as will be apparent to one skilled in the art. As an alternative to a programmable multiplex logic 370, a fixed hardwire gate may be used, such as an AND or OR gate, or other known logical gate. In the preferred embodiment, the output of the multiplex logic 370 defines a transparency enable (TE) signal, which is provided to a transparency enable bit (T) in a pixel data register 400. The other values (R, G, and B) in the pixel data field preferably are defined by the output signal from the resize engine.

As an alternative, or in addition to the transparency enable signal, the IN RANGE values are provided as input signals to mask logic 360. Preferably, the mask logic 360 receives an enable signal indicating whether the mask logic 360 is enabled. In the preferred embodiment, the mask logic also is programmable based upon the value of the SELECT or other programmable signal. The mask logic generates a MASK PIXEL output signal that is written to an appropriate address in a bit mask register 375, which determines which bits are written to the frame buffer. If desired, the MASK PIXEL output signal may be combined with the transparency enable (TE) output signal by an AND gate 380.

The operation of the present invention will now be described with reference to FIGS. 3 and 4. In certain graphics applications, it may be desirable to resize an image, and to copy a portion of the resized image to a destination array of pixels. The resize engine and color compare logic make it possible to quickly and efficiently perform such an operation, and to permit subsequent use of the resized image. In the preferred embodiment, control logic 325 receives graphics signals on the HIF bus, causing registers to be loaded with source address signals, destination address signals, and various control signals defining the resize operation and transparency operation. The source array of pixels identifies the object (with any associated background necessary to define a rectangular image) to be resized. The destination array of pixels identifies the location in the frame buffer where the modified source image is to be stored. The resize operation is defined as a stretch, shrink, or combination stretch/shrink (stretch in one direction, shrink in the other) operation by the control signals. Further, the type of shrink or stretch may be defined, as well as the shrink or stretch factor. Alternatively, the shrink/stretch factor may be calculated based upon the source and destination address values. Based upon the address values and control signals, a resize operation is performed to produce a resized RGB output signal. The present invention also preferably is capable of receiving video data and sizing, filtering and converting the video data in a single operation. The video data preferably is first converted to RGB values, then resized and filtered (through shrinking) to obtain a resized RGB signal representative of the video signal.

Once the image has been resized, but preferably before the image is written to the destination pixel array in the frame buffer, the color compare logic 425 determines which pixels should be written and which should be made transparent, and proceeds to embed a transparency enable bit as part of the pixel field for each pixel in the resized image. Upper and lower registers for each color preferably are loaded with threshold values to permit certain colors or certain combinations of colors to be made transparent. Colors within a defined range, or combinations of ranges, may then be made transparent by setting the transparency enable bit for all pixels within the color range or ranges. Alternatively, certain colors may be written based upon the color comparison. As yet another possibility, certain pixels may be masked based upon the results of the color comparison.

Once the transparency enable bit value is determined for each pixel, the pixel value is stored in the destination array of pixels in the frame buffer. Further operations on the resized and transparency enabled pixel values then are possible, including texture mapping, and the like. Thus, in a single operation, graphics or video images may be resized and overlaid over a different graphics background. As an example, a decal may be resized and transparency bit enabled to permit the resized decal to be overlaid on a different background in a destination array. The resized decal also may be used to provide efficient decal texturing in a 3D animation application. By resizing (and thus filtering the image), less memory is required for the texture mapping. In addition, the embedding of the transparency enable bit permits the image to be quickly moved and overlaid in subsequent destinations.

In addition to the capability to embed a transparency enable bit as part of a resize BitBLT for RGB graphics data, the present invention can perform the same operation for YUV video data. Thus, the present invention includes the capability to perform video stretching and transparency operations on YUV video data in a single bit block transfer operation. In the preferred embodiment, and as shown in FIG. 3, the YUV video is converted to RGB data. Using the circuitry of FIGS. 3 and 4, the converted YUV video data is provided to the resize engine where it is resized. The resized signals then may be transparency embedded in the same fashion as other graphics data.

The implementation of the present invention also permits the use of transparent overlays of "sprites" which are scaled by the stretch engine. Thus, instead of requiring scaling to be performed by software running on the host processor, the present invention enables sprites to be scaled and overlaid in a single operation in the graphics processor. As a result, use of the host processor is minimized, and generation of sprites occurs more efficiently.

The present invention also permits levels of detail (LOD's) to be generated for use with texture "Mip" mapping. Mip maps are used to represent different size images of the same object, and typically are switched to represent different distances to an object in a 3D animation. The present invention permits LOD's to be generated which contain transparency bits to permit decal texture operations.

Yet another aspect of the present invention is to provide "2-½" dimensional graphics with 2D logic. Transparencies often are used to build multiple viewing angles of an object, such as a flying saucer or space ship. Each view of the object then is transparency bit enabled and used to perform transparency BitBLT operations to represent animation by switching between the different viewing angles. The present invention permits the different viewing angles to be scaled as part of the transparency overlay in a single operation to show a changing distance to the revolving or turning object. The fact that the object can be scaled and transparency overlaid in a single operation increases the performance of the 2D graphics system and gives a 3D effect.

The present invention permits numerous other graphical manipulations which will be apparent to one skilled in the art. Numerous variations and modifications will become apparent to those skilled in the art once the above disclosure is fully appreciated. It is intended that the following claims be interpreted to embrace all such variations and modifications.

I claim:

1. A graphics subsystem for generating pixel values, comprising:

a host processor generating a display list of parameter values defining a primitive;

a system memory storing said display list of parameter values;

a graphics processor coupled to said host processor and said system memory via a system bus;

wherein said graphics processor includes a resize engine and color compare logic capable of resizing and transparency enabling a source array of pixels in a single operation.

2. A graphics subsystem as in claim 1, wherein the resized and transparency enabled source array of pixels is written to a destination array.

3. A graphics subsystem as in claim 2, wherein each of the pixels in the destination array of pixels includes a transparency enable bit.

4. A graphics subsystem as in claim 3, wherein each of the pixels in the destination array of pixels includes resized red, green and blue pixel values.

5. A graphics subsystem as in claim 4, wherein the resize engine and color compare logic includes a register with a color value stored therein, and a comparator for comparing the value in the register with one or more of the resized color pixel values and producing a comparison output signal.

6. A graphics subsystem as in claim 5, wherein the status of the transparency enable bit is dependent upon the comparison output signal.

7. A graphics subsystem as in claim 1, wherein the resize engine and color compare logic includes a resize engine for stretching and/or shrinking the source array of pixels.

8. A graphics subsystem as in claim 1, wherein the resize engine and color compare logic includes a resize engine for generating resized color pixel values, and a color compare logic for comparing the resized color pixel values with predetermined threshold values for each of the color pixel values.

9. A graphics subsystem as in claim 8, wherein the resized color pixel values include a red pixel value, a green pixel value, and a blue pixel value, and the color compare logic includes:

a first pair of registers for defining a range for the color red;

a second pair of registers for defining a range for the color green; and a third pair of registers for defining a range for the color blue.

10. A graphics subsystem as in claim 1, wherein the resize engine and color compare logic includes color converter circuitry for converting video signals to graphics signals for resizing.

11. A graphics subsystem for generating pixel values, comprising:

a host processor generating a display list of parameter values defining a primitive;

a system memory storing said display list of parameter values;

a graphics processor coupled to said host processor and said system memory via a system bus;

wherein said graphics processor includes a resize engine and color compare logic capable of resizing and transparency enabling a source array of pixels in a single operation, said resize engine and color compare logic including a resize engine for generating resized color pixel values, and a color compare logic for comparing the resized color pixel values with predetermined threshold values for each of the color pixel values, said resized color pixel values including a red pixel value, a green pixel value, and a blue pixel value, and the color compare logic including:

a first pair of registers for defining a range for the color red and a first set of comparators for comparing the range for the color red with the red pixel value;

a second pair of registers for defining a range for the color green and a second set of comparators for comparing the range for the color green with the green pixel value;

a third pair of registers for defining a range for the color blue and a third set of comparators for comparing the range for the color blue with the blue pixel value; and wherein each of the sets of comparators generates an output signal indicating if the pixel value is within the range defined by the register pairs.

12. A graphics subsystem as in claim 11, wherein the color compare logic further includes multiplex logic receiving the output signals from each of the sets of comparators, and in response generating a transparency enable output signal defining the transparency enable bit.

13. A graphics subsystem as in claim 12, wherein the multiplex logic receives an input signal selecting the comparator output signals to use to generate the transparency enable output signal.

14. A graphics subsystem as in claim 11, wherein the color compare logic further includes mask logic receiving the output signals from each of the sets of comparators, and in response generating a mask output signal for the resized pixel.

15. A graphics accelerator capable of providing accelerated graphics operations, comprising:

an interface unit for coupling to a system bus;

a graphics engine for generating an image;

a frame buffer coupled to said graphics engine for storing said image; and a resize engine and color compare logic for resizing the image and embedding a transparency bit enable in the resized image before storing the resized and transparency bit enabled image as a destination array of pixels in the frame buffer.

16. A graphics accelerator as in claim 15, wherein said resize engine and color compare logic is capable of performing a resize bit block transfer and a transparency bit block transfer in a single operation.

17. A graphics accelerator as in claim 15, wherein said resize engine and color compare logic includes a resize engine for resizing the image, and a color compare logic for embedding the transparency bit enable in the resized image.

18. A graphics accelerator as in claim 17, wherein the resized image comprises a pixel field with color pixel values includes a red pixel value, a green pixel value, and a blue pixel value, and the color compare logic including:

a first pair of registers for defining a range for the color red;

a second pair of registers for defining a range for the color green; and a third pair of registers for defining a range for the color blue.

19. A graphics accelerator as in claim 18, wherein the color compare logic further includes:

a first set of comparators for comparing the range for the color red with the red pixel value;

a second set of comparators for comparing the range for the color green with the green pixel value;

a third set of comparators for comparing the range for the color blue with the blue pixel value; and wherein each of the sets of comparators generate an output signal indicating if the pixel value is within the range defined by the register pairs.

20. A graphics accelerator as in claim 19, wherein the color compare logic further includes multiplex logic receiving the output signals from each of the sets of comparators, and in response generating a transparency enable output signal defining the transparency enable bit.

21. A graphics accelerator as in claim 20, wherein the multiplex logic receives an input signal selecting the comparator output signals to use to generate the transparency enable output signal.

22. A graphics accelerator as in claim 21, wherein the color compare logic further includes mask logic receiving the output signals from each of the sets of comparators, and in response generating a mask output signal for the resized pixel.

23. A graphics accelerator as in claim 15, wherein the resize engine and color compare logic includes color converter circuitry for converting video signals to graphics signals for resizing.

24. A graphics accelerator as in claim 15, further comprising a texture engine for texture mapping the destination array of pixels.

25. A graphics accelerator capable of providing accelerated graphics operations, comprising:

an interface unit for coupling to a system bus;

a graphics engine for generating an image;

a frame buffer coupled to said graphics engine for storing said image; and a resize engine and mask logic for resizing the image and masking portions of the resized image before storing the resized image as a destination array of pixels in the frame buffer.

26. A graphics accelerator as in claim 25, wherein the resize engine and mask logic also is capable of embedding a transparency enable bit for each pixel in the destination array.

27. A graphics accelerator as in claim 26, wherein pixels are masked based upon a pattern comparison.

28. A graphics accelerator as in claim 25, wherein pixels are masked based upon a color comparison.

29. A method for performing a resize bit block transfer and a transparency bit block transfer as part of a single operation, comprising the steps of:

retrieving a source array of pixels from memory;

resizing the source array to obtain resized color pixel values;

establishing at least one color threshold range;

comparing the resized color pixel values with the color threshold range;

embedding a transparency enable bit for each resized color pixel value within the color threshold range.

30. A method as in claim 29, wherein a different color threshold range is provided for each color pixel value.

31. A method as in claim 29, further comprising the step of generating a destination pixel value comprising the resized color pixel values and the transparency enable bit.

* * * * *